(12) United States Patent
Courtright et al.

(10) Patent No.: US 9,061,707 B2
(45) Date of Patent: Jun. 23, 2015

(54) EXTRUDED FENDER ATTACHMENT BRACKET

(71) Applicant: FORD GLOBAL TECHNOLOGIES, LLC, Dearborn, MI (US)

(72) Inventors: Mark Joseph Courtright, Allen Park, MI (US); Dragan B. Stojkovic, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 76 days.

(21) Appl. No.: 13/942,899

(22) Filed: Jul. 16, 2013

(65) Prior Publication Data
US 2015/0021956 A1 Jan. 22, 2015

(51) Int. Cl.
*B62D 25/02* (2006.01)
*B62D 25/08* (2006.01)
*B62D 25/16* (2006.01)
*B62D 65/02* (2006.01)

(52) U.S. Cl.
CPC .............. *B62D 25/02* (2013.01); *B62D 25/082* (2013.01); *B62D 25/163* (2013.01); *B62D 65/02* (2013.01)

(58) Field of Classification Search
CPC ..... B62D 25/082; B62D 65/02; B62D 65/163
USPC ................... 296/193.05, 203.03, 193.11, 191
See application file for complete search history.

(56) References Cited

U.S. PATENT DOCUMENTS

| | | | |
|---|---|---|---|
| 5,358,304 A | 10/1994 | Kanemitsu et al. | |
| 6,227,606 B1* | 5/2001 | Schroeder et al. | 296/146.1 |
| 6,729,008 B2 | 5/2004 | Nishijima | |
| 7,267,394 B1* | 9/2007 | Mouch et al. | 296/203.02 |
| 7,341,299 B1* | 3/2008 | Baccouche et al. | 296/30 |
| 7,461,890 B2* | 12/2008 | Yatsuda | 296/203.02 |
| 7,878,579 B2* | 2/2011 | Yoshino et al. | 296/198 |
| 8,246,105 B2* | 8/2012 | Mildner | 296/187.09 |
| 8,308,193 B2* | 11/2012 | Lux et al. | 280/785 |
| 2007/0172167 A1* | 7/2007 | Lew | 384/536 |
| 2013/0062911 A1* | 3/2013 | Takeuchi et al. | 296/203.02 |

FOREIGN PATENT DOCUMENTS

JP 2007296883 11/2007

* cited by examiner

*Primary Examiner* — Pinel Romain
(74) *Attorney, Agent, or Firm* — Raymond Coppiellie; Price Heneveld LLP

(57) ABSTRACT

A mounting bracket mounts a distal end of a body panel to an adjacent distal end of a structural frame member of a motor vehicle. The mounting bracket comprises a single piece extruded fender attachment bracket having a first horizontally projecting ear attached to a first surface of the distal end of the structural frame member, a second horizontally projecting ear attached to the distal end of the body panel, and a depending projecting ear extending perpendicularly to and adjacent the first horizontally projecting ear, the depending projecting ear being attached to a second surface of the distal end of the structural frame member. The mounting bracket rigidly attaches the distal end of the body panel to the structural frame member.

20 Claims, 5 Drawing Sheets

EXTRUDED FENDER ATTACHMENT BRACKET

FIELD OF THE INVENTION

The present invention generally relates to a fender attachment bracket for a motor vehicle, specifically an extruded fender attachment bracket that attaches the front fender to the vehicle front structure.

BACKGROUND OF THE INVENTION

Mounting techniques for body panels for use in motor vehicles are generally well-known in the art. Traditionally, such mounting techniques include threaded fasteners arranged about the periphery of the body panel that are used to fasten the body panel to the structural frame members of the motor vehicle, which traditionally were formed from stamped and welded metal components.

Recently, hydro formed metal frame structures have become more commonly used for forming such structural frame members, particularly in the front of the motor vehicle and around the engine of the motor vehicle. Hydro forming, as is known, employs a fluid to exert pressure against a metal work piece, such a sheet or tube, within a die to shape the metal work piece into a finished and desired shape. However, hydro formed tubes require relatively large bend radii in comparison with other forming techniques, such as stamping. Thus, in some applications, hydro formed tubes used as front frame structures are inappropriate for providing an attachment location for body panels, particularly for the motor vehicle front fender, since the fender must have an attachment near the front vehicle nose to provide adequate stiffness at the tip of the fender and dimensional capability to fit properly with the nose of the hood. Hydro formed front frame members have heretofore been unable to provide a fender nose attachment surface due to the large bend radii required for manufacturing. The use of a hydro formed front frame structural member also limits the opportunities for placing a hood support bumper near the front corner of the hood. Such hood support bumpers are required to support the hood while closed and reduce hood over-slam travel upon closing the hood.

Stamped brackets have been used in some instances as attachment brackets. However, such stamped brackets are inherently weak as attachment brackets due to the shape and thickness limitations inherent in the stamping process. For example, a single stamping is unable to be formed in the shape of a "T" with a depending support leg and a horizontal portion extending from the front frame structural member to the front fender. Obtaining such a bracket configuration would instead require a multi-piece assembly, significantly increasing the cost and tooling requirements for assembly and joining operations. The dimensional variability of the bracket also tends to increase and adversely affect the fit of the hood relative the fender. Hence, solutions for improving the mounting of front body panels, such as front fenders, would be advantageous.

The present disclosure addresses the shortcomings of the aforementioned mounting techniques for mounting front body panels to hydro formed metal front structural frame members through the use of a single piece extruded fender attachment bracket that attaches to the motor vehicle hydro formed metal front structural frame member and provides a mounting surface for a hood bumper.

SUMMARY OF THE INVENTION

According to one aspect of the present disclosure, a mount mounts a distal end of a body panel to an adjacent and spaced apart distal end of a structural frame member of a motor vehicle. The mount comprises a single piece extruded fender attachment bracket having a first horizontally projecting ear attached to a first surface of the distal end of the structural frame member, a second horizontally projecting ear attached to the distal end of the body panel, and a depending projecting ear extending perpendicularly to and adjacent the first horizontally projecting ear, the depending projecting ear being attached to a second surface of the distal end of the structural frame member. The mounting bracket rigidly attaches the distal end of the body panel to the structural frame member.

Still another aspect of the present disclosure is a mounting bracket for a structural frame member fabricated from a hydro formed metal tubular structure.

Yet another aspect of the present disclosure is a mounting bracket for a motor vehicle having a front end and a front hood having an open and closed position mounted proximate the front end, wherein the structural frame member is disposed at the front end of the motor vehicle, the body panel is a front fender attached at its distal end and the attachment bracket further comprises a hood bumper attached to an upper surface of the second horizontally projecting ear disposed to support the front hood in the closed position and mitigate front hood over-slam travel when the front hood is closed from the open position.

An additional aspect of the present disclosure is an attachment bracket having an opening extending through the second horizontally projecting ear and the hood bumper having a resilient tab received in the opening for attaching the hood bumper to the attachment bracket.

Another aspect of the present disclosure is an attachment bracket extruded from a metal billet of aluminum or steel.

Still another aspect of the present disclosure is an attachment bracket having an inclined leg interconnecting the second horizontally projecting ear and the depending ear.

A further aspect of the present disclosure is an attachment bracket wherein the inclined leg, the second horizontally projecting ear and the depending ear form a transverse cavity in the bracket.

Yet a further aspect of the present disclosure is an attachment bracket wherein each of the first horizontally projecting ear, the second horizontally projecting ear, and the depending projecting ear has a fastener opening for receiving a threaded fastener by which the attachment bracket is removably fastened to and attached to each of the structural frame member and the body panel.

An additional aspect of the present disclosure is an attachment bracket wherein the structural frame member has an inboard projecting portion at its distal end and the distal end of the body panel are disposed apart one from the other.

Yet another aspect of the present disclosure is a mount for mounting a body panel to a motor vehicle having a structural frame member, wherein the body panel has a distal end and the frame structural member has a distal end proximate to and spaced from the distal end of the body panel, the mount comprising a single piece extruded bracket rigidly attached to the structural frame member and the distal end of the body panel.

Another aspect of the present disclosure is a single piece extruded bracket having an opening extending through the upper surface of the single piece extruded bracket and a hood bumper having a resilient tab received in the opening for attaching the hood bumper to the attachment bracket.

A yet additional aspect of the present disclosure is a method for mounting a front body panel to a motor vehicle having a front structural frame member, wherein the front body panel has a distal end and the front frame structural member has a distal end adjacent to and spaced from the distal end of the body panel. The method comprises the steps of installing the front structural frame member in the motor vehicle, disposing the front body panel proximate to the front structural frame member in its final, installed position, and attaching a mounting bracket to each of the front body panel and front frame structural member so as to extend between the distal end of the front body panel and the distal end of the front frame structural member. The mounting bracket comprises a single piece extruded fender attachment bracket having a first horizontally projecting ear attached to a first surface of the distal end of the structural frame member, a second horizontally projecting ear attached to the distal end of the body panel, and a depending projecting ear extending perpendicularly to and adjacent the first horizontally projecting ear, the depending projecting ear being attached to a second surface of the distal end of the structural frame member, wherein the mounting bracket rigidly attaches the distal end of the body panel to the structural frame member.

A further aspect of the present disclosure is a method further comprising the step of disposing a hood bumper to support a front hood in the closed position and mitigate front hood over-slam travel when the front hood is closed from an open position.

Still another aspect of the present disclosure is a method for mounting a front body panel to a motor vehicle having a front structural frame member, wherein each of the first horizontally projecting ear, the second horizontally projecting ear, and the depending projecting ear has a fastener opening for receiving a threaded fastener, the method further comprising the step of removably fastening and attaching the mounting bracket to each of the structural frame member and the body panel via the threaded fasteners.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
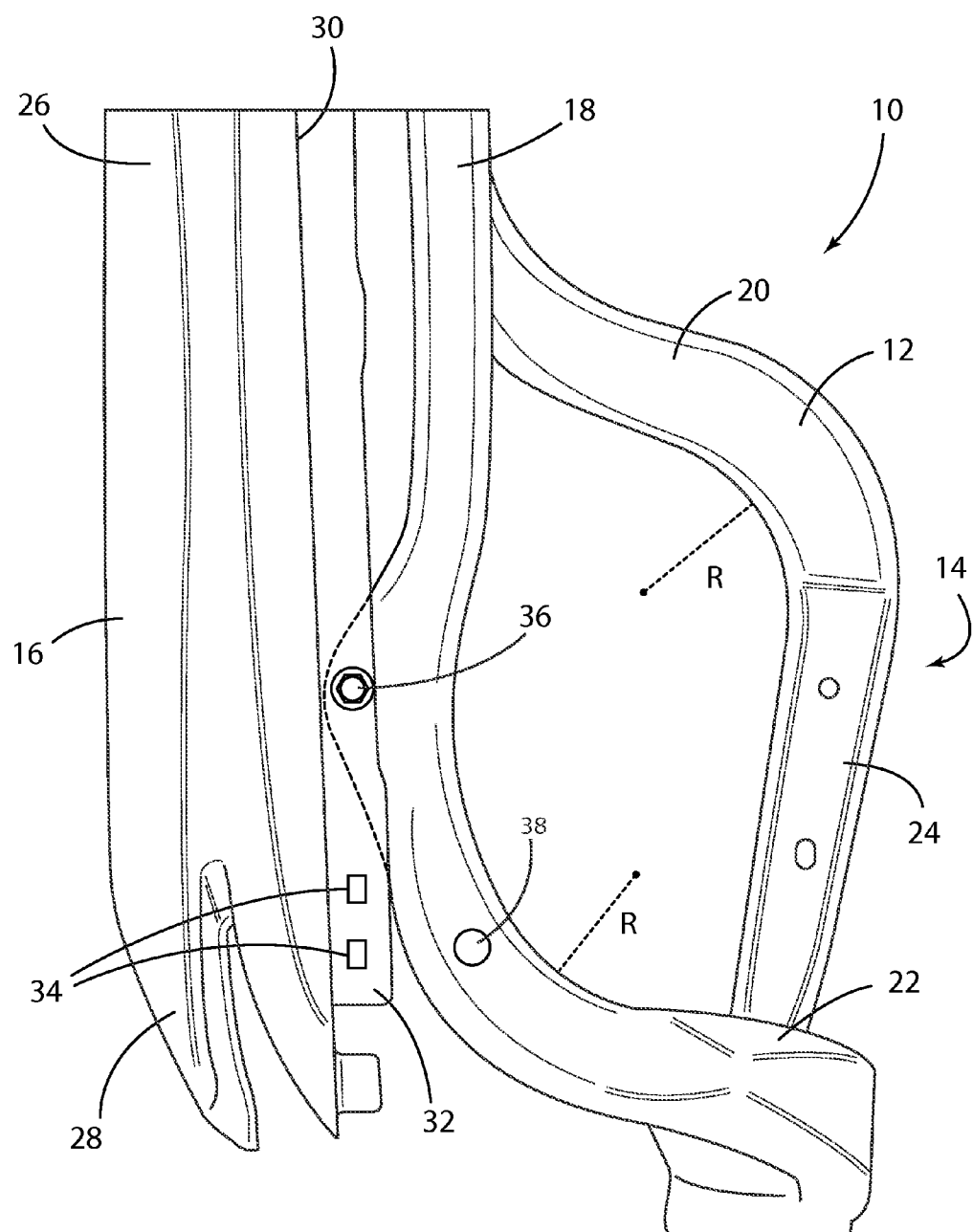
FIG. 1 is a front perspective view of a motor vehicle stamped front structural frame member and front fender nose.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a motor vehicle 10 includes a prior art stamped front structural frame assembly 12 that extends forward of the dash panel (not shown) within the motor vehicle 10, such as in an engine compartment 14. As is typical, one such stamped front frame assembly 12 is mounted on either side of the motor vehicle 10 to perform a multiple of functions, including energy management in the event of frontal or oblique impact events, support for the engine and transmission assembly and related engine components, support for suspension components, and a location for the attachment of a front fender assembly 16. The stamped front structural frame assembly 12 is typically fabricated from cold rolled steel that is stamped, welded, and formed into a substantially rectangular cross-sectional configuration, which in turn can be formed into rather complicated structures having relatively small bend radii R where bent. For example, the stamped front frame assembly shown in FIG. 1 has a rearward end 18, a lower extending member 20, and an upper extending member 22. The lower extending member 20 may be formed at a right angle R to extend inboard to create an engine support and mounting platform 24, as shown in FIG. 1. The upper extending member 22, in contrast, may be formed to extend substantially forward longitudinally and substantially parallel with a body panel, in particular, the front fender assembly 16, and then bent at a right angle to extend inboard.

The front fender assembly 16, as is typical, has a rearward end 26 and a forward distal end or nose 28. The upper side edge 30 of the front fender assembly 16 is typically provided with a stamped flange 32, into which mounting holes 34 are formed and over which the hood 35 is situated in the closed position. The nose 28 of the fender is also disposed proximate the front grill and headlight assembly (not shown). Hence, accurate and consistent positioning of the fender flange 32 and fender nose 28 relative the hood 35, front grill, and headlight assembly is important to the aesthetics of the motor vehicle.

The accurate and consistent positioning of the fender flange 32 and fender nose 28 relative the hood 35, front grill, and headlight assembly can be readily accomplished by mounting the flange 32 of the fender assembly 16 directly to the upper extending member 22 via fastener 36, as may be seen in FIG. 1. Further, a front hood bumper 38 can be mounted proximate to the nose 28 of the fender assembly 16 to support the hood 35 while closed and reduce hood over-slam travel upon closing the hood 35 from the open position.

Figure 2:
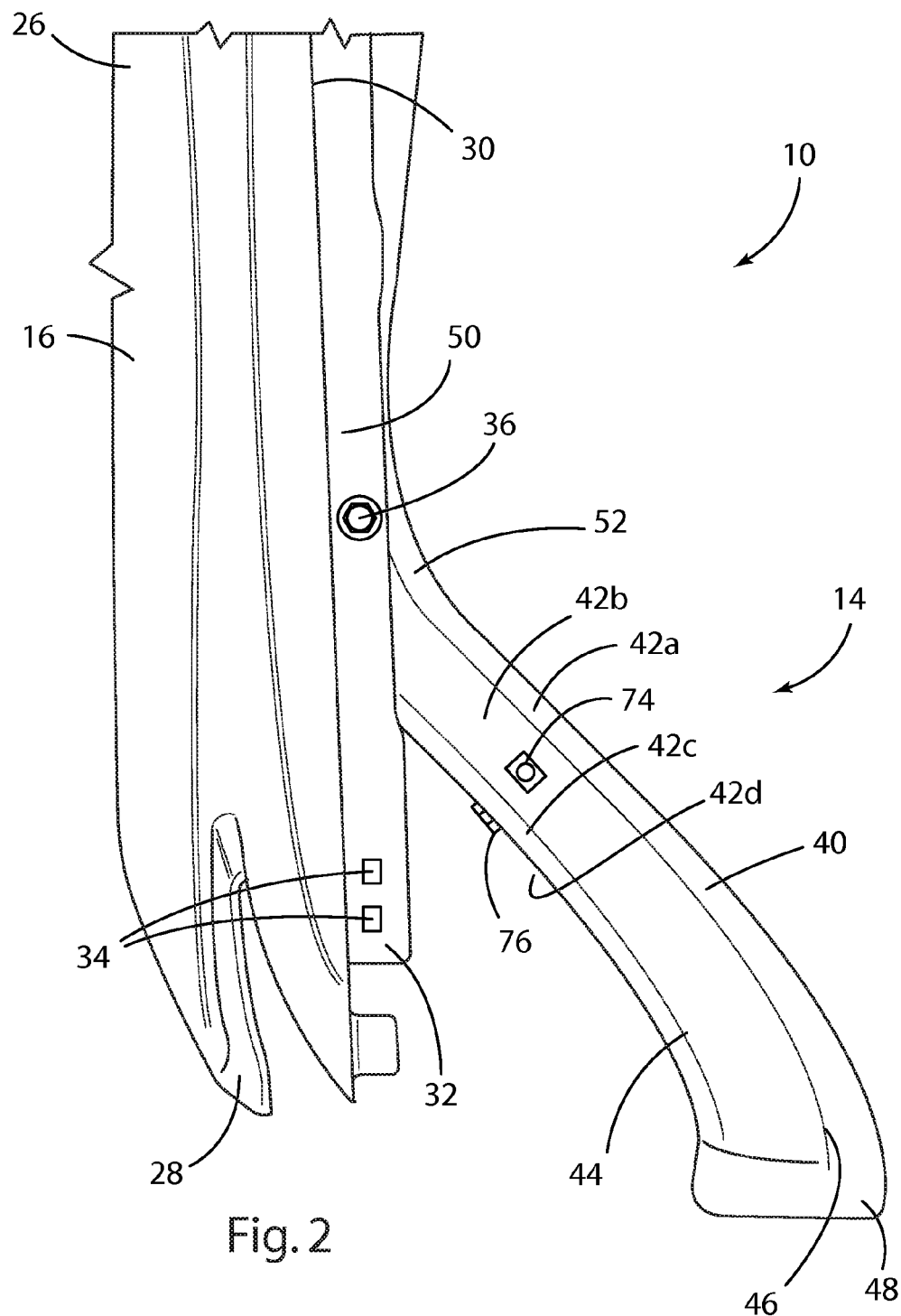
FIG. 2 is a front perspective view of a motor vehicle hydro formed upper front structural frame member and front fender nose.
Figure 3:
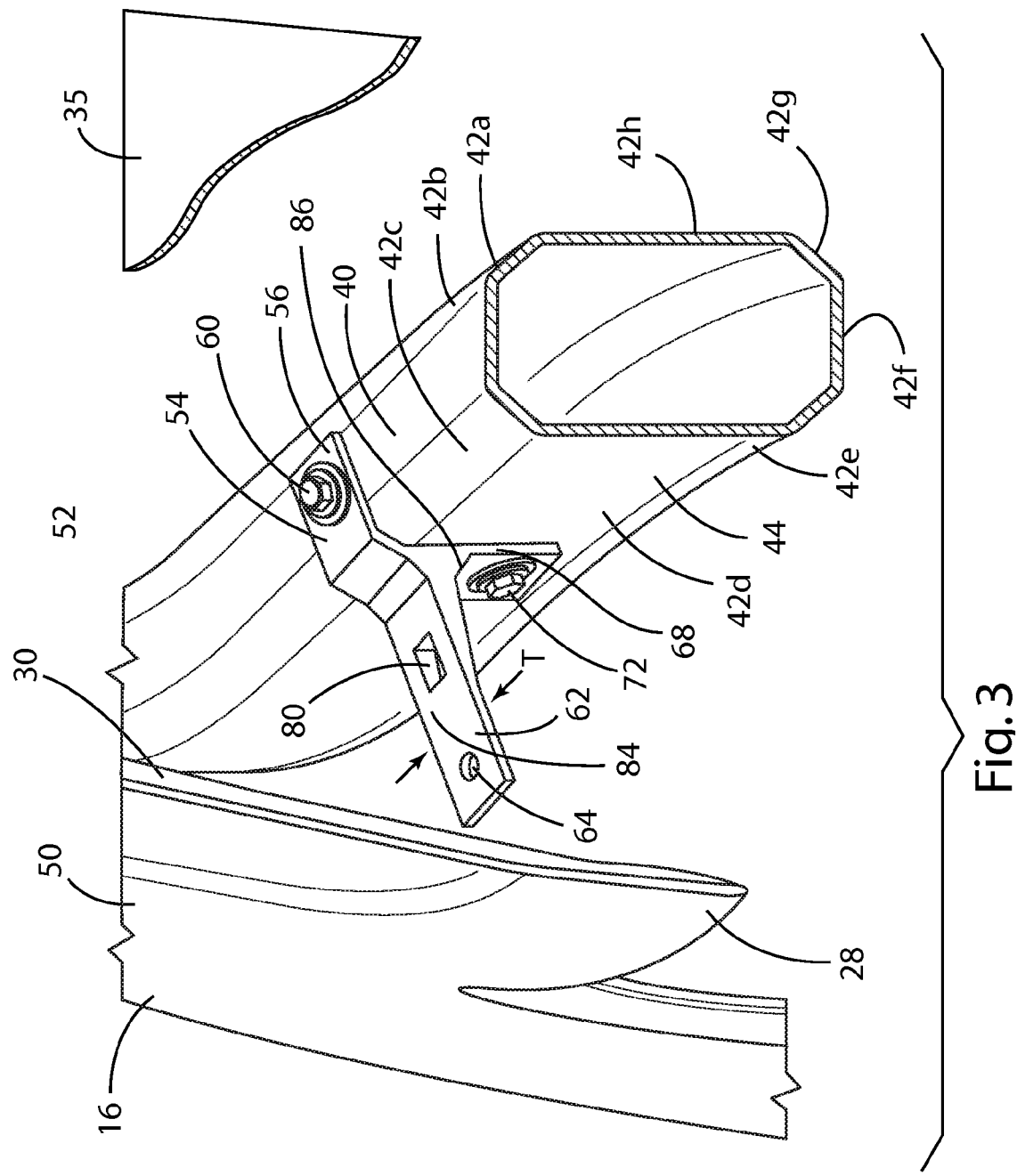
FIG. 3 is front perspective view of a motor vehicle hydro formed upper front structural frame member proximate the front fender nose (with the fender flange not shown) and a first embodiment of the extruded fender attachment bracket of the present disclosure.
Figure 5:
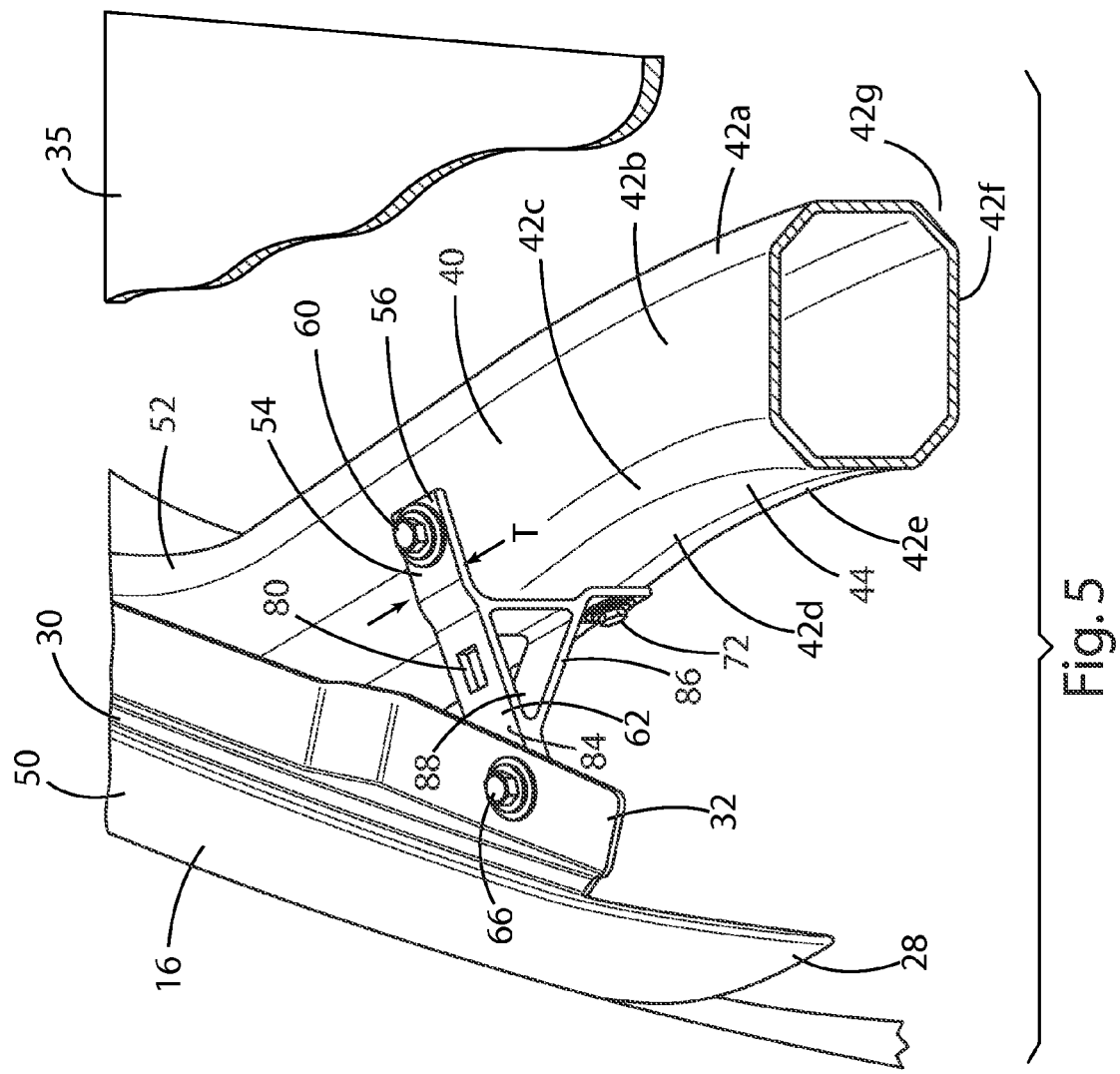
FIG. 5 is a front perspective view of a motor vehicle hydro formed upper front structural frame member and a second embodiment of the extruded fender attachment bracket of the present disclosure attached to the front fender nose.

The hydro formed front structural frame 40 in accordance with the present disclosure is shown in FIG. 2, and has a substantially convolute tubular configuration having a number of integrated sides 42a-g for reinforcement, as shown in FIGS. 2-3 and 5, to form a generally hexagonal cross-sectional profile. The hydro formed front structural frame 40 includes a forward distal end 44 provided with an inboard projecting portion 46. A flange 48 can also be provided, to which another body panel or engine-related component, such as a radiator and radiator support, may be attached. As shown, however, while a middle portion 50 of the fender flange 32 may be attached to a middle length 52 of the forward longitudinally extending portion of the front structural frame 40, the distal end 44, which is closest to the nose 28 of the front fender assembly 16, is still relatively far removed and unsupported.

As shown in FIG. 3, a single piece extruded bracket 54 is preferably hot extruded from a metal billet of aluminum or steel through processes well-known in the art and cut to the desired thickness T. The bracket 54 has a first horizontally projecting ear 56 attached through an opening 58 and fastener 60 to the side 42b of the front structural frame 52, and a second horizontally projecting ear 62 is attached through another opening 64 and fastener 66 to the fender flange 32 proximate the nose 28 of the fender assembly 16. The bracket 54 also has a depending projecting ear 68 extending perpendicularly to and adjacent the first horizontally projecting ear 56 and is attached through opening 70 and fastener 72 to a side 42d of the front structural frame 40. Preferably, the bracket 54 is bolted to the frame 40 on both locations through weld nuts 74, 76 installed on the front structural frame 40 and is bolted to the fender flange via threaded fastener 66. However, the bracket 54 may also be welded to the front structural frame 40.

The bracket 54 is also provided with a hood bumper 78, which is formed from a resilient material, as is typical. An opening 80 in the second horizontally projecting ear 62 is provided through which a resilient tab 82 of the hood bumper 78 is received in the opening 80 for attaching the hood bumper 78 to the bracket 54. Thus, the hood bumper 78 is substantially disposed on an upper surface 84 of the bracket 54 and is positioned to support the hood 35 while closed and reduce hood over-slam travel upon closing the hood 35 from the open position.

Figure 4:
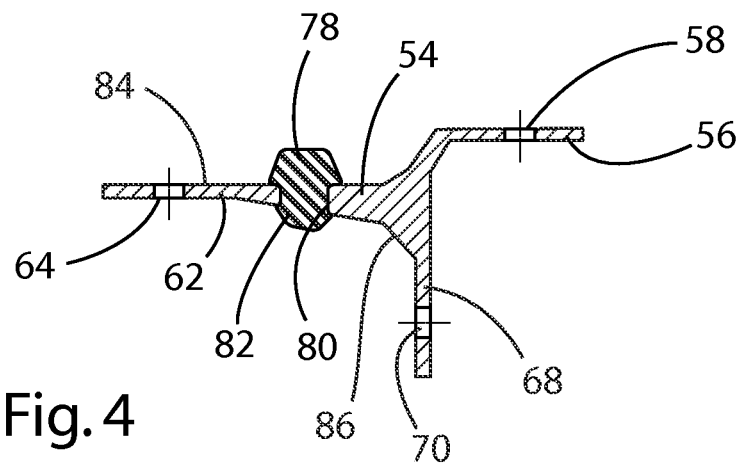
FIG. 4 is a side cross-sectional view of the first embodiment of the extruded fender attachment bracket of the present disclosure.
Figure 6:
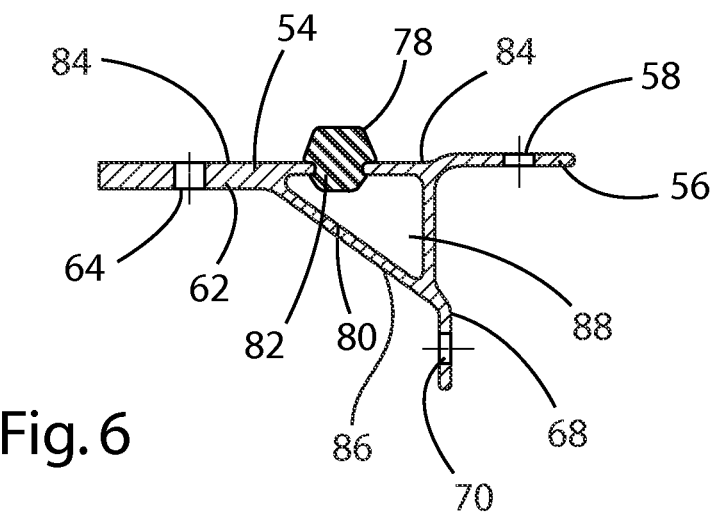
FIG. 6 is a side cross-sectional view of the second embodiment of the extruded fender attachment bracket of the present disclosure.

The bracket 54 may also be provided with an inclined leg 86 interconnecting the second horizontally projecting ear 62 and the depending ear 68 to provide improved structural support. In a first embodiment of the bracket 54, the inclined leg is completely integrated into the bracket 54, as shown in FIGS. 3 and 5. In another embodiment of the bracket 54, shown in FIGS. 4 and 6, the inclined leg 86, second horizontally projecting ear 62, and depending ear 68 form a transverse cavity 88 in the bracket 54 in order to lighten the bracket 54. The transverse cavity 88 may be formed during the extrusion process or may be machined separately after the bracket 54 is extruded and cut to the desired thickness T.

It is contemplated that the presently disclosed bracket can not only be used on a hydro formed front structural frame 40, but on any vehicle seeking a structure to form a bridge between an existing motor vehicle structural frame member and an exterior body panel. For example, while the front end of the motor vehicle is addressed herein, the disclosed bracket 54 can also be used at the rear of a motor vehicle proximate the trunk opening and truck lid.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A mount for mounting a body panel to a motor vehicle having a structural frame member, wherein the body panel has a distal end and the structural frame member has a distal end adjacent to and laterally spaced from the distal end of the body panel, the mount comprising:

a single piece extruded fender attachment bracket having a first horizontally projecting ear directly attached to a first surface of the distal end of the structural frame member, a second opposing horizontally projecting ear directly attached to the distal end of the body panel, and a depending projecting ear extending perpendicularly downwardly from and adjacent the first horizontally projecting ear, the depending projecting ear being directly attached to a second surface of the distal end of the structural frame member, wherein the attachment rigidly attaches the distal end of the body panel to the structural frame member.

2. The mount of claim 1, wherein the structural frame member is fabricated from a hydro formed metal substantially tubular structure.

3. The mount of claim 1, wherein the motor vehicle has a front end and a front hood having an open and closed position mounted proximate the front end, wherein the structural frame member is disposed at the front end of the motor vehicle, the body panel is a front fender attached at its distal end and the attachment bracket further comprises a hood bumper attached to an upper surface of the second horizontally projecting ear disposed to support the front hood in the closed position and mitigate front hood over-slam travel when the front hood is closed.

4. The mount of claim 3, wherein the attachment bracket has an opening extending through the second horizontally projecting ear and the hood bumper has a resilient tab received in the opening for attaching the hood bumper to the attachment bracket.

5. The mount of claim 1, wherein the attachment bracket is extruded from a metal billet of aluminum or steel.

6. The mount of claim 1, wherein the bracket has an inclined leg interconnecting the second horizontally projecting ear and the depending ear.

7. The mount of claim 6, wherein the inclined leg, the second horizontally projecting ear, and the depending ear form a transverse cavity in the bracket.

8. The mount of claim 1, wherein each of the first horizontally projecting ear, the second horizontally projecting ear, and the depending projecting ear have a fastener opening for receiving a threaded fastener by which the bracket is removably fastened and attached to each of the structural frame member and the body panel.

9. The mount of claim 1, wherein the structural frame member has an inboard projecting portion at its distal end, such that the distal end of the structural frame member and the distal end of the body panel are disposed apart one from the other.

10. A mount for mounting a front body panel to a motor vehicle having a structural frame member, wherein the body panel has a distal end and the structural frame member has a distal end proximate to and laterally spaced from the distal end of the body panel, the mount comprising a single piece extruded bracket rigidly directly attached to the structural frame member and the distal end of the body panel.

11. The mount of claim 10, wherein the single piece extruded bracket has a first horizontally projecting ear attached to a first surface of the distal end of the structural frame member, a second opposing horizontally projecting ear attached to the distal end of the body panel, and a depending projecting ear extending perpendicularly to and adjacent the first horizontally projecting ear, the depending projecting ear being attached to a second surface of the distal end of the structural frame member, wherein the mounting bracket rigidly attaches the distal end of the body panel to the structural frame member.

12. The mount of claim 10, wherein the structural frame member is fabricated from a hydro formed metal substantially tubular structure.

13. The mount of claim 10, wherein the motor vehicle has a front hood having an open and closed position mounted proximate the front end, wherein the single piece extruded bracket further comprises a hood bumper attached to an upper surface thereof disposed to support the front hood in the closed position and mitigate front hood over-slam travel when the front hood is closed.

14. The mount of claim 13, wherein the single piece extruded bracket has an opening extending through the upper surface of the single piece extruded bracket and the hood bumper has a resilient tab received in the opening for attaching the hood bumper to the attachment bracket.

15. The mount of claim 10, wherein the single piece extruded bracket is extruded from a metal billet of aluminum or steel.

16. The mount of claim 11, wherein the single piece extruded bracket has an inclined leg interconnecting the second horizontally projecting ear and the depending ear.

17. The mount of claim 16, wherein the inclined leg, the second horizontally projecting ear, and the depending ear form a transverse cavity in the single piece extruded bracket.

18. A method for mounting a front body panel to a motor vehicle having a front structural frame member, wherein the front body panel has a distal end and the front frame structural member has a distal end adjacent to and laterally spaced from the distal end of the body panel, the method comprising the steps of:

installing the front structural frame member in the motor vehicle;

disposing the front body panel proximate to the front structural frame member in its final, installed position; and directly attaching a mounting bracket to each of the front body panel and front structural frame member so as to extend between the distal end of the front body panel and the distal end of the front structural frame member, wherein the mounting bracket comprises a single piece extruded fender attachment bracket having a first horizontally projecting ear directly attached to a first surface of the distal end of the structural frame member, a second opposing horizontally projecting ear directly attached to the distal end of the body panel, and a depending projecting ear extending perpendicularly downwardly from and adjacent the first horizontally projecting ear, the depending projecting ear being directly attached to a second surface of the distal end of the structural frame member, wherein the mounting bracket rigidly attaches the distal end of the body panel to the structural frame member.

19. The method of claim 18, wherein the motor vehicle has a front hood having an open and closed position and wherein the attachment bracket further comprises a hood bumper attached to an upper surface of the second horizontally projecting ear, the method further comprising the step of disposing the hood bumper to support the front hood in the closed position and mitigate front hood over-slam travel when the front hood is closed.

20. The method of claim 19, wherein each of the first horizontally projecting ear, the second horizontally projecting ear, and the depending projecting ear has a fastener opening for receiving a threaded fastener, the method further comprising the step of removably fastening and attaching the mounting bracket to each of the structural frame member and the body panel via the threaded fasteners.

* * * * *